United States Patent Office 3,423,403
Patented Jan. 21, 1969

3,423,403
STEROIDAL [7,6-c]-PYRAZOLES OF THE ANDROSTANE AND PREGNANE SERIES
John H. Fried, Palo Alto, Calif., and Alexander D. Cross, Mexico City, Mexico, assignors to Syntex Corporation, Panama, Panama, a corporation of Panama
No Drawing. Filed Aug. 26, 1966, Ser. No. 575,255
U.S. Cl. 260—239.5         14 Claims
Int. Cl. C07c 173/10, 173/00, 169/22

This invention relates to novel cyclopentanophenanthrene derivatives and to a process for their preparation. More particularly, it relates to novel steroids of the androstane and pregnane series containing a pyrazolo moiety fused to the C–6 and C–7 carbon atoms of the steroid nucleus. Specifically, it relates to novel steroids of the androstane series and the pregnane series, namely 3-keto-4-pregneno-[7,6-c]-pyrazoles, 3-keto-4-androsteno-[7,6-c]-pyrazoles, the 19-nor and $\Delta^{1,4}$ analogs thereof. These steroids demonstrate hormonal activities characteristic of the parent steroids. These physiologically active steroids of the present invention are represented by the following partial formula:

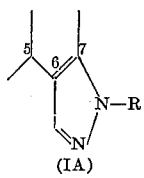

(IA)

wherein R is hydrogen, methyl, phenyl, p-fluorophenyl, p-chlorophenyl, p-methoxyphenyl or p-tolyl.

In the above partial formula of the novel steroids of the present invention, the [7,6-c]-pyrazole group is shown to be substituted at position-2 by the R substituent defined above. The second form of the [7,6-c]-pyrazoles of the present invention is shown in the following partial formula wherein R is as defined above:

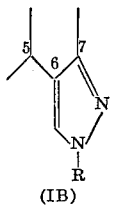

(IB)

For the sake of clarity and to avoid undue prolixity, it is to be understood that hereinafter reference to 2'-[7,6-c]-pyrazoles of partial Formula IA and illustrations thereof is not exclusive of the second form shown in partial Formula IB, i.e., the 1'-[7,6-c]-pyrazoles, but rather is inclusive thereof.

The process for the preparation of the novel steroidal [7,6-c]-pyrazoles is shown by the following partial reaction sequence:

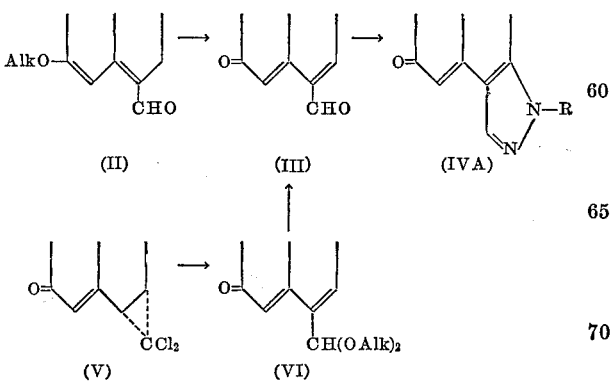

In the practice of the process, involving the illustrated reaction sequence of II–III–IVA, the starting material is a 6-formyl 3-enol ether of the pregnane or androstane series. These starting materials are conveniently prepared by the method of D. Burn, et al., Tetrahedron, 20, 597–609 (1964) by the reaction of a 3-enol ether with the Vilsmeier reagent. A compound of partial Formula II is allowed to react with 2,3-dichloro-5,6-dicyanobenzoquinone in the presence of an acid and in an inert organic solvent at about 0° C. to afford the 3-keto-$\Delta^{4,6}$-diene-6-formyl compound, represented by partial Formula III. A preferred choice of acid and solvent is p-toluenesulfonic acid and tetrahydrofuran, respectively.

An alternate method for preparing the 3-keto-$\Delta^{4,6}$-diene-6-formyl steroid, as represented by partial Formula III, is shown in the sequence (V), (VI), to (III). In this method, a 6α,7α-dichloromethylene steroid, as shown by partial Formula V, is hydrolyzed by treatment with a basic alcoholic solution to form the corresponding acetal, as shown by partial Formula VI. In this conversion, the basic alcoholic solution is a solution of an alkali metal hydroxide in a low molecular weight alcohol such as methanol, ethanol, propanol or butanol. The preferred basic alcoholic solution is a solution of sodium hydroxide in methanol.

The thus-formed acetal, of partial Formula VI, is hydrolyzed by treatment with an acidic solution to form the 3-keto-$\Delta^{4,6}$-diene-6-formyl intermediate of partial Formula III. The acidic solution is an aqueous solution of an acid, i.e., hydrochloric acid, acetic acid, sulfuric acid, nitric acid or the like. The preferred method of acid hydrolysis is by treatment with an aqueous solution of acetic acid in dioxane for a period of 3 or 4 hours.

The 6-formyl group in compound (III) is allowed to condense with a molar equivalent of hydrazine hydrate or a substituted hydrazine hydrochloride followed by ring closure to afford the novel [7,6-c]-pyrazole represented by partial Formula IVA. In the practice of the above ring formation, a compound of Formula III is condensed with a molar equivalent of hydrazine hydrate or a substituted hydrazine hydrochloride and a molar equivalent of sodium acetate in an aqueous methanolic solution at 0° C. for a period of about 24 hours. The reaction intermediate is then dissolved in acetic acid and heated at 60° C. for a period of about ½ hour, after which the material is treated with 2,3-dichloro-5,6-dicyanobenzoquinone at 0° C. for an additional ½ hour to afford the novel [7,6-c]-pyarzole compound of the present invention. Among the substituted hydrazines are methyl hydrazine, phenyl hydrazine, p-fluorophenyl hydrazine, p-chlorophenyl hydrazine, p-methoxyphenyl hydrazine and p-tolyl hydrazine.

The novel steroidal [7,6-c]-pyrazoles of the present invention having valuable cortical hormonal properties are represented by the following structural formula.

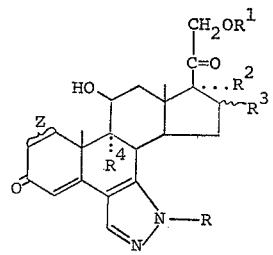

wherein

Z is a carbon-carbon single bond or a carbon-carbon double bond;
R is hydrogen, methyl, phenyl or p-fluorophenyl;
$R^1$ is hydrogen, tetrahydropyran-2-yl, tetrahydrofuran- 2-yl or a hydrocarbon carboxylic acyl group containing less than 12 carbon atoms;

$R^2$ is hydrogen, hydroxy, difluoromethyl, dichloromethyl or a hydrocarbon carboxylic acyloxy group containing less than 12 carbon atoms;

$R^3$ is hydrogen, α-methyl, β-methyl, α-hydroxy or an α-hydrocarbon carboxylic acyloxy group of less than 12 carbon atoms;

$R^2$ and $R^3$ together is the group

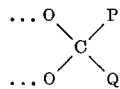

wherein P is hydrogen or lower alkyl and Q is lower alkyl or aryl of up to 8 carbon atoms; and $R^4$ is hydrogen or fluoro.

The compounds of the above formula are valuable cortical hormones with high anti-inflammatory and low catabolic properties and are useful in the treatment of rheumatoid arthritis, contact dermatitis, allergies and the like, and may be administered via usual routes in standard pharmaceutical compositions and at dosages appropriate for the particular conditions being treated, i.e., from 0.5γ to 5 mg./kg./day.

The novel steroidal pyrazoles of the above formula can contain substituents, groupings, combinations and elaborations thereof, in addition to those illustrated in the above formula for cortical hormones known to those skilled in the art of steroid chemistry. For example, the novel cortical hormones of the above formula can contain other known combinations and elaborations of the 3-keto-$\Delta^4$ system or the 3-keto-$\Delta^{1,4}$ system such as 3β-hydroxy, a 3β-ether, such as tetrahydropyran-2'-yloxy or tetrahydrofuran-2'-yloxy and a 3β-ester such as acetoxy, propionoxy and the like. In addition, other known cortical hormone elaborations of the 17α,21-dihydroxy - 20 - keto side chain can be present such as, for example, 17α,21-cyclic acetal or ketal, 21-fluoro, and the like.

The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, acyloxy containing up to 12 carbon atoms, nitro, amino, halogeno and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

Illustrative of the 6-formyl-3-enol ethers of the pregnane series for the preparation of cortical hormones are the following:

3 - methoxy - 6 - formyl - 11β,17α - dihydroxy - 21-acetoxypregna-3,5-dien-20-one;

3 - methoxy - 6 - formyl - 11β - hydroxy - 17α,21 - di-acetoxypregna-3,5-dien-20-one;

3 - methoxy - 6 - formyl - 11β - hydroxy - 17α,20; 20,21-bismethylenedioxypregna-3,5-diene.

In the practice of preparing the cortical hormones, a 9α-fluoro substituent is present in the starting material before forming the [7,6-c]-pyrazolo moiety. A 1-dehydro system is introduced subsequently by treatment with 2,3-dichloro-5,6-dicyanobenzoquinone.

In addition, other novel steroidal [7,6-c]-pyrazoles of the pregnane series are progestational agents and are useful in fertility control and the management of various menstrual disorders. These compounds also possess hormonal properties characteristic of anti-androgenic, anti-gonadotrophic and anti-estrogenic agents. These compounds may be administered via usual routes in the standard pharmaceutical compositions and at dosage rates appropriate for the particular condition being treated, generally from 0.5γ to 5 mg./kg./day.

Illustrative of the steroidal [7,6-c]-pyrazoles demonstrating progestational activities are those compounds shown by the following representative formula:

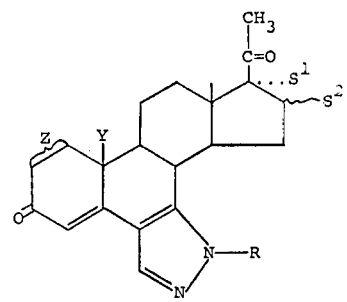

wherein

R is hydrogen, methyl, phenyl or p-fluorophenyl;

$S^1$ is hydrogen, hydroxy or a hydrocarbon carboxylic acyloxy group containing less than 12 carbon atoms;

$S^2$ is hydrogen, α-methyl, β-methyl, α-hydroxy or an α-hydrocarbon carboxylic acyloxy group of less than 12 carbon atoms;

$S^1$ and $S^2$ together is the group

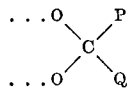

in which P is hydrogen or lower alkyl and Q is a lower alkyl or aryl group of up to 8 carbon atoms;

Y is hydrogen or methyl; and

Z is a carbon-carbon single bond or a carbon-carbon double bond, Y being methyl when Z is a carbon-carbon double bond.

Illustrative of the 6-formyl-3-enol ethers of the pregnane series for the preparation of progestational agents are the following:

3 - methoxy - 6 - formyl - 17α - acetoxypregna - 3,5-dien-20-one;

3 - methoxy - 6 - formyl - 16α - methyl - 17α - acetoxy-pregna-3,5-dien-20-one;

3 - ethoxy - 6 - formyl - 16α,17α - isopropylidenedi-oxypregna-3,5-dien-20-one; and 3 - methoxy - 6 - formyl - 19 - norpregna - 3,5 - dien-20-one.

The novel steroidal [7,6 - c] - pyrazoles of the androstane series demonstrate hormonal activities characteristic of an anabolic agent. These compounds are useful post-operatively and in geriatrics for tissue build-up. These compounds may be administered via usual routes in standard pharmaceutical compositions and at dosage rates appropriate for the particular condition being treated, generally from 0.5γ to 5 mg./kg./day.

Illustrative of the novel steroidal [7,6-c]-pyrazoles of the androstane series demonstrating anabolic activities, are those compounds shown by the following representative formula:

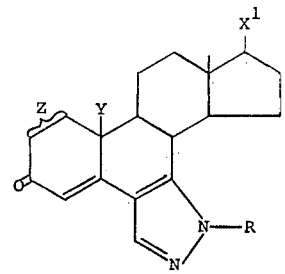

wherein

R is hydrogen, methyl, phenyl or p-fluorophenyl;

$X^1$ is keto or the group

$X^2$ is hydrogen, tetrahydropyran-2′-yl, tetrahydrofuran-2′-yl or a hydrocarbon carboxylic acyl group containing less than 12 carbon atoms;

$X^3$ is hydrogen, lower alkyl, alkenyl or alkynyl;

Y is hydrogen or methyl; and

Z is a carbon-carbon single bond or a carbon-carbon double bond, Y being methyl when Z is a carbon-carbon double bond.

By the term lower alkyl, alkenyl or alkynyl is meant a group containing from 1 to 4 carbon atoms. For example, alkyl includes methyl, ethyl, propyl and the like; alkenyl includes vinyl and the like; and alkynyl includes ethynyl and the like.

Illustrative of the 6-formyl-3-enol ethers of the androstane series for the preparation of the novel anabolic agents of the present invention, are the following:

3-methoxy-6-formyl-17β-acetoxyandrosta-3,5-diene;

3-methoxy-6-formyl-17α-methyl-17β-acetoxyandrosta-3,5-diene;

3 - methoxy - 6 - formyl-17β-acetoxy-19-norandrosta-3,5-diene; and 3-methoxy-6-formylandrosta-3,5-dien-17-one.

In the practice of the process, the substituents at C–17 are introduced prior to the formation of the [7,6-c]-pyrazole moiety. The 1-dehydro system is introduced subsequently by treatment with 2,3-dichloro-5,6-dicyanobenzoquinone in dioxane under reflux conditions for about 10 hours.

The following examples will further illustrate the invention but are not necessarily intended to limit the scope thereof.

Example 1.—11β,17α,21-trihydroxy-3,20-diketo-2′-phenyl-4-pregneno-[7,6-c]-pyrazole, the 9α-fluoro analog, the 16α-methyl analog and the 9α-fluoro-16α-methyl analog To a solution of 5 g. of cortisone in 200 ml. of chloroform are added 40 ml. of 37% aqueous formaldehyde and 5 ml. of concentrated hydrochloric acid. The mixture is stirred for 48 hours at room temperature and the two layers then separated. The aqueous layer is extracted with chloroform and the combined organic layer and chloroform extracts are washed with water to neutrality, dried over sodium sulfate and evaporated to dryness to yield 17,20;20,21-bismethylenedioxypregn-4-ene - 3,11 - dione which is recrystallized from methanol:ether.

To a suspension of 1 g. of the latter compound in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17,20;20,21-bismethylenedioxypregna-3,5-diene-3,11-dione which is recrystallized from acetone:hexane.

To a cooled (0° C.) solution of 10 ml. of chloroform and 1 ml. of dimethylformamide is added 1 ml. of phosphorus oxychloride. The mixture is allowed to warm to room temperature, and held at this temperature for 30 minutes. To the above solution is added a solution of the latter compound in 3 ml. of dimethylformamide and 3 ml. of chloroform, and the resulting mixture is allowed to stand at room temperature for a period of four hours. The reaction mixture is then poured into ice water and the organic phase is extracted with ethyl acetate. The extracts are washed with water to neutrality, dried and evaporated to dryness to yield 6-formyl-17,20;20,21-bismethylenedioxypregna-3,5-diene-3,11-dione which is recrystallized from acetone:benzene.

To a solution of 1 g. of the latter compound in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-formyl-17,20;20,21-bismethylenedioxypregna-4,6-diene-3,11-dione which may be further purified through recrystallization from acetone:hexane.

A mixture of 2 g. of the latter compound, 2 g. of sodium acetate, 100 ml. of aqueous methanol and 1 ml. of phenylhydrazine hydrochloride is allowed to stand under nitrogen at 0° C. for 24 hours. The reaction mixture is evaporated to dryness, dissolved in 20 ml. of acetic acid and warmed at 60° C. for ½ hour and then cooled to 0° C. To the solution of the above reaction material is added 20 ml. of tetrahydrofuran, 1.05 molar equivalents of 2,3-dicholro-5,6-dicyano-1,4-benzoquinone and 100 mg. of p-toluenesulfonic acid. The resulting mixture is stirred at 0° C. for 30 minutes, filtered, and diluted with 100 ml. of of methylene chloride. The organic phase is separated, washed with 5% aqueous sodium hydroxide solution until the washings are colorless and then with water to neutrality, dried over sodium sulfate and evaporated to dryness to yield 17,20;20,21 - bismethylenedioxy-3,11-diketo 2′-phenyl-4-pregneno-[7,6-c]-pyrazole which may be further purified through recrystallization from acetone:hexane.

A solution of 1 g. of sodium borohydride in 3 ml. of water is added to an ice-cooled solution of 1 g. of the latter compound in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 3β,11β-dihydroxy-17,20;20,21-bismethylenedioxy-2′-phenyl-4-pregneno-[7,6-c] - pyrazole which may be further purified by recrystallization from acetone:hexane.

One gram of the latter compound in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 3-keto-11β-hydroxy-17,20;20,21 - bismethylenedioxy-2′-phenyl-4-pregneno-[7,6 - c] - pyrazole which may be further purified through recrystallization from acetone:hexane.

A suspension of 1 g. of the latter compound in 10 ml. of 48% aqueous hydrofluoric acid is stirred at 0° C. for 90 minutes. At the end of this time, the reaction mixture is neutralized with 5% aqueous potassium bicarbonate solution and extracted with ethyl acetate. These extracts are evaporated to dryness under reduced pressure and chromatographed on silica gel with 2:1 hexane:ethyl acetate to yield 3,20-diketo-11β,17α,21-trihydroxy-2′-phenyl-4-pregneno-[7,6-c]-pyrazole which may be further purified through recrystallization from isopropanol.

Utilizing the above procedure, 9α-fluorocortisone, 16α-methylcortisone, and 9α-fluoro-16α-methylcortisone are converted to the 2′-phenyl-4-pregneno-[7,6-c]-pyrazoles, namely 9α-fluoro-3,20-diketo-11β,17α,21-trihydroxy-2′-phenyl-4-pregneno-[7,6-c]-pyrazole;

16α-methyl-3,20-diketo-11β,17α,21-trihydroxy-2′-phenyl-4-pregneno-[7,6-c]-pyrazole; and 9α-fluoro-16α-methyl-3,20-diketo-11β,17α,21-trihydroxy-2′-phenyl-4-pregneno-[7,6-c]-pyrazole.

Utilizing the same starting materials and procedure with one exception, i.e. substituting first hydrazine hydrate, second methyl hydrazine hydrochloride and third p-fluorophenylhydrazine hydrochloride for phenylhydrazine hydrochloride, there are obtained the corresponding 4-pregneno-[7,6-c], 2′-methyl-4-pregneno-[7,6-c], and 2′- p-fluorophenyl-4-pregneno-[7,6-c]-pyrazole analogs, respectively.

Example 2.—4-androsteno-[7,6-c]-pyrazoles

To a solution of 1 g. of 3-ethoxy-6-formyl-17α-methyl-17β-acetoxyandrosta-3,5-diene [prepared according to the procedure of D. Burn et al., Tetrahedron, 20, 597–609 (1964)] in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-formyl-17α-methyl-17β-hydroxyandrosta-4,6-dien-3 - one which may be further purified through recrystallization from acetone:hexane.

A mixture of 2 g. of the latter compound, 2 g. of sodium acetate, 100 ml. of aqueous methanol and 1 ml. of phenylhydrazine hydrochloride is allowed to stand under nitrogen at 0° C. for 24 hours. The reaction mixture is evaporated to dryness, dissolved in 20 ml. of acetic acid and warmed at 60° C. for ½ hour and then cooled to 0° C. To a solution of the above reaction material is added 20 ml. of tetrahydrofuran, 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered and diluted with 100 ml. of methylene chloride. The organic phase is separated, washed with 5% aqueous sodium hydroxide solution until the washings are colorless and then with water to neutrality, dried over sodium sulfate and evaporated to dryness to yield 3-keto-2'-phenyl-4-pregneno-[7,6-c]-pyrazole which may be further purified through recrystallization from acetone:hexane.

3-ethoxy-6-formyl-17α-methyl-17β-acetoxy-19-nor-androsta-3,5-diene;
3-ethoxy-6-formyl-17β-acetoxyandrosta-3,5-diene; and
3-ethoxy-6-formyl-17β-acetoxy-19-norandrosta-3,5-diene, are converted to the corresponding [7,6-c]-pyrazoles, namely 3-keto-17α-methyl-17β-acetoxy-2'-phenyl-4,19-nor-androsteno-[7,6-c]-pyrazole;
3-keto-17β-acetoxy-2'-phenyl-4-androsteno-[7,6-c]-pyrazole; and
3-keto-17β-acetoxy-2'-phenyl-4,19-norandrosteno-[7,6-c]-pyrazole.

Utilizing the same starting materials and procedure, but with one exception, i.e. substituting first hydrazine hydrate, second methyl hydrazine hydrochloride, and third p-uuorophenylhydrazine hydrochloride for the phenylhydrazine hydrochloride, there are obtained the corresponding 4-androsteno-[7,6-c]-pyrazoles, 2'-methyl-4-androsteno-[7,6-c]-pyrazoles, and 2'-p-fluorophenyl-[7,6-c]-4-androsteno-pyrazoles, respectively.

Example 3.—[7,6-c]-pyrazalo-17α-acetoxy progesterone

To a solution of 1 g. of 3-ethoxy-6-formyl-17α-acetoxy-20,20-ethylenedioxypregna-3,5-diene [prepared according to the procedure of D. Burn et al., Tetrahedron, 20, 597–609 (1964)] in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-formyl-17α-acetoxy-20, 20 - ethylenedioxypregna - 4,6-dien-3-one which may be further purified through recrystallization from acetone:hexane.

A mixture of 0.5 g. of the latter compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 6-formyl-17α-acetoxy-pregna-4,6-diene-3,20-dione which is recrystallized from acetone:hexane.

A mixture of 2 g. of the latter compound, 2 g. of sodium acetate, 100 ml. of aqueous methanol and 1 ml. of phenylhydrazine hydrochloride is allowed to stand under nitrogen at 0° C. for 24 hours. The reaction mixture is evaporated to dryness, dissolved in 20 ml. of acetic acid and warmed at 60° C. for ½ hour.

To a solution of 1 g. of the above reaction material in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 3,20-diketo-17α-acetoxy-2'-phenyl-4-pregneno-[7,6-c]-pyrazole which may be further purified through recrystallization from acetone:hexane.

Utilizing the same starting material and procedure with one exception, i.e., substituting first hydrazine hydrate, second methyl hydrazine hydrochloride and third p-fluorophenyl-hydrazine hydrochloride for phenyl hydrazine hydrochloride, there are obtained the corresponding 4-pregneno-[7,6-c]-pyrazole, 2'-methyl-4-pregneno-[7,6-c]-pyrazole and the 2'-p-fluoropheny-4-pregneno-[7,6-c]-pyrazole.

Example 4.—Δ$^{1,4}$-dienes

A mixture of 0.5 g. of 3,20-diketo-11β,17α,21-tri-hydroxy-2'-phenyl-4-pregneno-[7,6-c]-pyrazole, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 3,20 - diketo - 11β,17α,21 - trihydroxy - 2' - phenyl - 1,4-pregnadieno-[7,6-c]-pyrazole which is further purified by recrystallization from acetone:hexane. In a similar manner, those final products of Example 1 are converted to the corresponding Δ$^{1,4}$-diene.

Example 5.—16α,17α-acetonide-4-pregneno-[7,6-c]-pyrazoles and the Δ$^{1,4}$-analogs To a solution of 1 g. of 3-ethoxy-6-formyl-11β-hydroxy-16α,17α - isopropylidenedioxy - 20,20 - ethylenedioxy - 21-(tetrahydropyran-2-yloxy)-pregna-3,5-diene [prepared according to the procedure of D. Burn et al., Tetrahedron, 20, 597–609 (1964)] in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-formyl-11β-hydroxy-16α,17α-isopropylidenedioxy-20,20-ethylenedioxy - 21 - tetrahydropyran-2'-yloxypregna-4,6-dion-3-one which may be further purified through recrystallization from acetone:hexane.

A mixture of 2 g. of the latter compound, 2 g. of sodium acetate, 100 ml. of aqueous methanol and 1 ml. of phenylhydrazine hydrochloride is allowed to stand under nitrogen at 0° C. for 24 hours. The reaction mixture is evaporated to dryness, dissolved in 20 ml. of acetic acid and warmed at 60° C. for ½ hour.

To a solution of 1 g. of the above reaction material in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 11β-hydroxy-16α,17α-isopropylidenedioxy - 20,20 - ethylenedioxy-21-(tetrahydropyran-2'-yl)-3-keto - 2' - phenyl-4-pregneno-[7,6-c]-pyrazole which may be further purified through recrystallization from acetone:hexane.

A mixture of 0.5 g. of the latter compound in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 11β,21-dihydroxy - 16α,17α - isopropylidenedioxy-3,20-diketo-2'-phenyl-4-pregneno-[7,6-c]-pyrazole which is recrystallized from acetone:hexane.

A mixture of 0.5 g. of the latter compound, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 11β,21-dihydroxy-16α,17α-isopropylidenedioxy-3,20-diketo-2'-phenyl-1,4-pregnadieno-[7,6-c]pyrazole which is further purified by recrystallization from acetone:hexane.

In a similar fashion, using the above procedure, 3-ethoxy - 6 - formyl - 9α - fluoro - 11β - hydroxy - 16α,17α-isopropylidenedioxy - 21 - (tetrahydropyran - 2' - yloxy)-pregna-3,5-diene is converted to 9α-fluoro-11β,21-dihydroxy - 16α,17α - isopropylidenedioxy - 3,20 - diketo - 2'-phenyl-1,4-pregnadieno-[7,6-c]-pyrazole.

Utilizing the same starting materials and the above procedure with one exception, namely substituting first hydrazine hydrate, second methyl hydrazine hydrochloride, and third p-fluorophenyl hydrazine hydrochloride for phenyl hydrazine hydrochloride, there are obtained the corresponding [7,6-c]-pyrazoles, namely, 11β,21-dihydroxy - 16α,17α - isopropylidenedioxy - 3,20-diketo-1,4-pregnadieno-[7,6-c]-pyrazole;
9α-fluoro-11β,21-dihydroxy-16α,17α-isopropylidenedioxy-3,20-diketo-1,4-pregnadieno-[7,6-c]-pyrazole;
11β,21-dihydroxy-16α,17α-isopropylidenedioxy-3,20-diketo-2'-methyl-1,4-pregnadieno-[7,6-c]-pyrazole;
9α-fluoro-11β,21-dihydroxy-16α,17α-isopropylidenedioxy-3,20-diketo-2'-methyl-1,4-pregnadieno-[7,6-c]-pyrazole;
11β,21-dihydroxy-16α,17α-isopropylidenedioxy-3,20-diketo-2'-p-fluorophenyl-1,4-pregnadieno-[7,6-c]-pyrazole; and
9α-fluoro-11β,21-dihydroxy-16α,17α-isopropylidenedioxy-3,20-diketo-2'-p-fluorophenyl-1,4-pregnadieno-[7,6-c]-pyrazole.

Example 6.—Hydrolysis of a 6α,7α-dichloromethylene compound to a 6-formyl compound A mixture of 0.5 g. of 6α,7α-dichloromethylene-17β-acetoxyandrost-4-en-3-one is allowed to reflux with 0.5 ml. of 2 N sodium hydroxide in 8 ml. of methanol under an inert atmosphere of nitrogen. The reaction mixture is then concentrated to a small volume and partioned between a methylene chloride: aqueous sodium chloride mixture. The organic phase is separated, dried and evaporated to dryness. The residue is chromatographed on alumina and eluted with 50:50 ethyl ether:methylene chloride to yield 6-bismethoxymethylandrosta-4,6-dien-17β-ol which may be further purified by recrystallization from acetone:benzene.

A mixture of 1 g. of 6-bismethoxymethylandrosta-4,6-dien-17β-ol, 1 ml. of glacial acetic acid and 10 ml. of dioxane is allowed to reflux for 3 hours. At the end of the reaction, the product is extracted with ether and the extract is washed with water, dried and evaporated to dryness. The residue is chromatographed on alumina and eluted with ethyl ether:methylene chloride to yield 6-formylandrosta-4,6-dien-17β-ol which may be purified by recrystallization from petroleum ether:acetone.

Utilizing the above procedure, the following 6α,7α-dichloromethylene compounds, namely 6α,7α - dichloromethylene - 11β - hydroxy - 17,20;20,21-bismethylenedioxypregn-4-ene-3,20-dione; and
6α,7α - dichloromethylenepregn - 4 - ene - 3,20 - dione, are converted to the corresponding 6-formyl compounds, namely, 6 - formyl - 11β - hydroxy - 17,20;20,21 - bismethylenedioxypregn-4,6-diene-3,20-dione; and
6-formylpregna-4,6-diene-3,20-dione, respectively.

What is claimed is:

1. A process for the preparation of a steroidal [7,6-c]-pyrazole of the androstane or pregnane series which comprises treating a 6-formyl-3-enol ether steriod with 2,3-dichloro-5,6-dicyanobenzoquinone in an inert organic solvent to form a 3-keto-6-formyl-Δ$^{4,6}$-diene steriod, and condensing the formyl group in the latter compound with a hydrazine of the formula NH₂NHR in which R is hydrogen, methyl, phenyl or p-fluorophenyl, and treating the latter intermediate with acetic acid and then with 2,3-dichloro-5,6-dicyanobenzoquinone to form the steroidal [7,6-c]-pyrazole.

2. A steroidal [7,6-c]-pyrazole of the pregnane series having the formula:

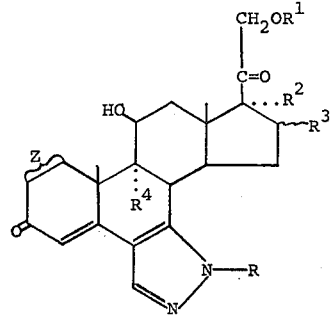

wherein Z is a carbon-carbon single bond or a carbon-carbon double bond;
R is hydrogen, methyl, phenyl or p-fluorophenyl;
R$^1$ is hydrogen, tetrahydropyran-2'-yl, tetrahydrofuran-2'-yl or a hydrocarbon carboxylic acyl group containing less than 12 carbon atoms;
R$^2$ is hydrogen, hydroxy or a hydrocarbon carboxylic acyloxy group containing less than 12 carbon atoms;
R$^3$ is hydrogen, α-methyl, β-methyl, α-hydroxy or a α-hydrocarbon carboxylic acyloxy group of less than 12 carbon atoms;
R$^2$ and R$^3$ together is the group

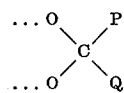

in which P is hydrogen or lower alkyl and Q is lower alkyl or aryl of up to 8 carbon atoms; and
R$^4$ is hydrogen or fluoro.

3. A compound according to claim 2 wherein Z is a carbon-carbon double bond; R is hydrogen, methyl, phenyl or p-fluorophenyl; $R^1$ is hydrogen; $R^2$ and $R^3$ together is the group

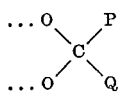

in which each of P and Q is methyl; and $R^4$ is hydrogen or fluoro.

4. A compound according to claim 2 wherein Z is a carbon-carbon double bond; R is hydrogen, methyl, phenyl or p-fluorophenyl; $R^1$ is hydrogen; $R^2$ is hydroxy; $R^3$ is α-methyl; and $R^4$ is hydrogen or fluoro.

5. A steroidal [7,6-c]-pyrazole of the pregnane series having the formula:

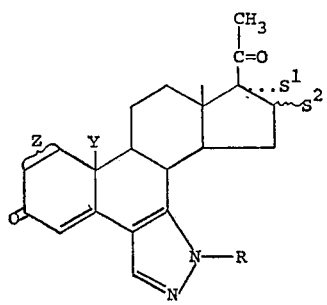

wherein

R is hydrogen, methyl, phenyl or p-fluorophenyl;
$S^1$ is hydrogen, hydroxy or a hydrocarbon carboxylic acyloxy group containing less than 12 carbon atoms;
$S^2$ is hydrogen, α-methyl, β-methyl, α-hydroxy or an α-hydrocarbon carboxylic acyloxy group of less than 12 carbon atoms;
$S^1$ and $S^2$ together in the group

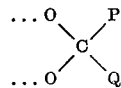

in which P is hydrogen or lower alkyl and Q is a lower alkyl or aryl group of up to 8 carbon atoms;
Y is hydrogen or methyl; and
Z is a carbon-carbon single bond or a carbon-carbon double bond, Y being methyl when Z is a carbon-carbon double bond.

6. A compound according to claim 5 wherein R is as defined therein; $S^1$ is acetoxy; $S^2$ is hydrogen; Y is methyl; and Z is a carbon-carbon single bond.

7. A compound according to claim 5 wherein R is as defined therein; $S^1$ and $S^2$ together is the group

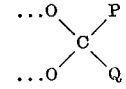

in which each of P and Q is methyl; Y is methyl; and Z is a carbon-carbon single bond.

8. A steroidal [7,6-c]-pyrazole of the androstane series having the formula:

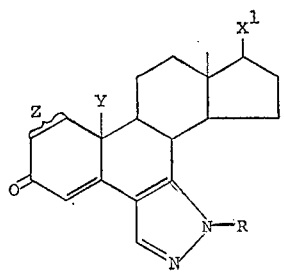

wherein

R is hydrogen, methyl, phenyl or p-fluorophenyl;
$X^1$ is keto or the group

in which $X^2$ is hydrogen, tetrahydropyran-2'-yl, tetrahydrofuran-2'-yl or a hydrocarbon carboxylic acyl group containing less than 12 carbon atoms and $X^3$ is hydrogen, lower alkyl, alkenyl or alkynyl;
Y is hydrogen or methyl; and
Z is a carbon-carbon single bond or a carbon-carbon double bond, Y being methyl when Z is a carbon-carbon double bond.

9. A compound according to claim 8 wherein R is as defined therein; $X^1$ is the group

in which $X^2$ is hydrogen and $X^3$ is hydrogen or methyl; Y is hydrogen or methyl; and Z is a carbon-carbon single bond.

10. A compound according to claim 8 wherein R is as defined therein; $X^1$ is the group

in which $X^2$ is tetrahydropyran-2-yl; $X^3$ is hydrogen or methyl; and Z is a carbon-carbon single bond.

11. A 3-keto-$\Delta^{4,6}$-diene-6-formyl steroid of the pregnane series having the formula:

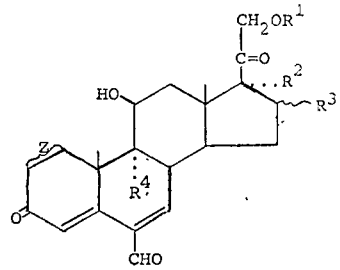

wherein

Z is a carbon-carbon single bond or a carbon-carbon double bond;
$R^1$ is hydrogen, tetrahydropyran-2'-yl, tetrahydrofuran-2'-yl or a hydrocarbon carboxylic acyl group containing less than 12 carbon atoms;
$R^2$ is hydrogen, hydroxy or a hydrocarbon carboxylic acyloxy group containing less than 12 carbon atoms;
$R^3$ is hydrogen, α-methyl, β-methyl, α-hydroxy or a α-hydrocarbon carboxylic acyloxy group of less than 12 carbon atoms;
$R^2$ and $R^3$ together is the group

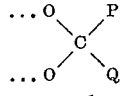

in which P is hydrogen or lower alkyl and Q is lower alkyl or aryl of up to 8 carbon atoms; and
$R^4$ is hydrogen or fluoro.

12. A 3-keto-$\Delta^{4,6}$-diene-6-formyl steroid of the pregnane series having the formula:

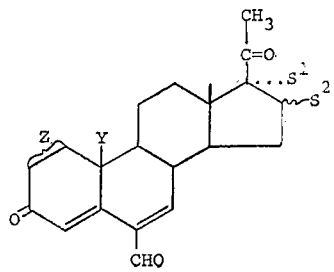

wherein
S¹ is hydrogen, hydroxy or a hydrocarbon carboxylic acyloxy group containing less than 12 carbon atoms;
S² is hydrogen, α-methyl, β-methyl, α-hydroxyl or a α-hydrocarbon carboxylic acyloxy group of less than 12 carbon atoms;
S² and S³ together is the group

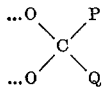

in which P is hydrogen or lower alkyl and Q is a lower alkyl or aryl group of up to 8 carbon atoms;
Y is hydrogen or methyl; and
Z is a carbon-carbon single bond or a carbon-carbon double bond, Y being methyl when Z is a carbon-carbon double bond.

13. A 3-keto-Δ⁴,⁶-diene-6-formyl steroid of the androstane series having the formula:

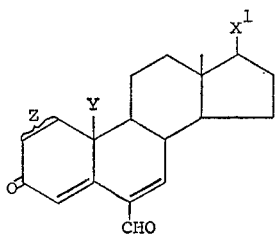

wherein
X¹ is keto or the group

in which X² is hydrogen, tetrahydropyran-2′-yl, tetrahydrofuran-2′-yl or a hydrocarbon carboxylic acyl group containing less than 12 carbon atoms and X³ is hydrogen, lower alkyl, alkenyl or alkynyl;
Y is hydrogen or methyl; and
Z is a carbon-carbon single bond or a carbon-carbon double bond, Y being methyl when Z is a carbon-carbon double bond.

14. A process for the preparation of a 3-keto-Δ⁴,⁶-diene-6-formyl steroid of the androstane or pregnane series which comprises first hydrolyzing a 3-keto-Δ⁴-ene-6α,7α-dichloromethylene steroid of the androstane or pregnane series under basic conditions to form a corresponding 3-keto-Δ⁴,⁶-diene-6-bisalkoxymethyl steroid of the androstane or pregnane series and second hydrolyzing the thus-formed 3 - keto - Δ⁴,⁶-diene - 6 - bisalkoxymethyl steroid under acidic conditions to form the 3-keto-Δ⁴,⁶-diene-6-formyl steroid of the androstane or pregnane series.

No references cited.

HENRY A. FRENCH, *Primary Examiner.*

U.S. Cl. X.R.

167—65, 74; 260—239.55, 397.3, 397.4, 397.45

UNITED STATES PATENT OFFICE
CERTIFICATE OF CORRECTION

Patent No. 3,423,403            Dated January 21, 1969

Inventor(s) JOHN H. FRIED and ALEXANDER D. CROSS

It is certified that error appears in the above-identified patent and that said Letters Patent are hereby corrected as shown below:

Column 7, line 36, after "hexane." insert -- Utilizing the same procedure, --;
              line 54, "p-uuorophenylhydrazine" should read -- p-fluorophenylhydrazine --.
Column 11, line 38, "in" should read -- is --.

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents